United States Patent [19]

Blaurock et al.

[11] 4,357,838

[45] Nov. 9, 1982

[54] BALL SCREW AND NUT DRIVE DEVICE

[75] Inventors: Günther Blaurock, Niederwerrn; Ernst Albert, Sand; Horst Altrock, Dittelbrunn, all of Fed. Rep. of Germany

[73] Assignee: Deutsche Star Kugelhalter GmbH, Schweinfurt, Fed. Rep. of Germany

[21] Appl. No.: 136,781

[22] Filed: Apr. 3, 1980

[30] Foreign Application Priority Data

Apr. 11, 1979 [DE] Fed. Rep. of Germany ....... 2914756

[51] Int. Cl.³ ............................................. F16H 25/22
[52] U.S. Cl. .................................. 74/424.8 R; 74/459
[58] Field of Search ................ 74/216.3, 424.8 R, 459

[56] References Cited

U.S. PATENT DOCUMENTS

| | | | |
|---|---|---|---|
| 2,166,106 | 7/1939 | Gormley | 74/459 |
| 2,502,066 | 3/1950 | Tanner | 74/459 |
| 3,234,810 | 2/1966 | Orner | 74/459 |
| 3,580,098 | 5/1971 | Goad | 74/459 |
| 3,771,382 | 11/1973 | Wilke | 74/459 |
| 3,815,435 | 6/1974 | Eschenbacher et al. | 74/459 |
| 3,850,046 | 11/1974 | Nilsson | 74/459 |
| 3,971,264 | 7/1976 | Detraz et al. | 74/459 |
| 4,070,921 | 1/1978 | Arnold | 74/459 |
| 4,148,226 | 4/1979 | Benton | 74/459 |
| 4,226,137 | 10/1980 | Sharp | 74/459 |

FOREIGN PATENT DOCUMENTS

| | | |
|---|---|---|
| 2437497 | 12/1975 | Fed. Rep. of Germany . |
| 1436798 | 3/1966 | France . |
| 687634 | 2/1953 | United Kingdom . |
| 892612 | 3/1962 | United Kingdom . |
| 957330 | 5/1964 | United Kingdom . |

*Primary Examiner*—Allan D. Herrmann
*Attorney, Agent, or Firm*—Toren, McGeady & Stanger

[57] ABSTRACT

In a ball screw and nut drive device, a helical ball spindle or channel is formed in the inner surface of a nut body and the outer surface of a screw. Balls are circulated through the helical ball channel being returned from one end to the other of the channel by deflecting channels and a return channel. Each deflecting channel is formed in part by a deflecting member fitted into a recess formed in the inner surface of the nut body. The deflecting member includes a projection for lifting balls out of the helical ball channel into the deflecting channel. The deflecting channel has a rectilinear part which can receive balls from the helical ball channel and a curved part connecting the rectilinear part with the return channel. The deflecting channel in the deflecting member is open along its length and the balls passing therethrough contact a wall in the recess formed in the nut body.

29 Claims, 20 Drawing Figures

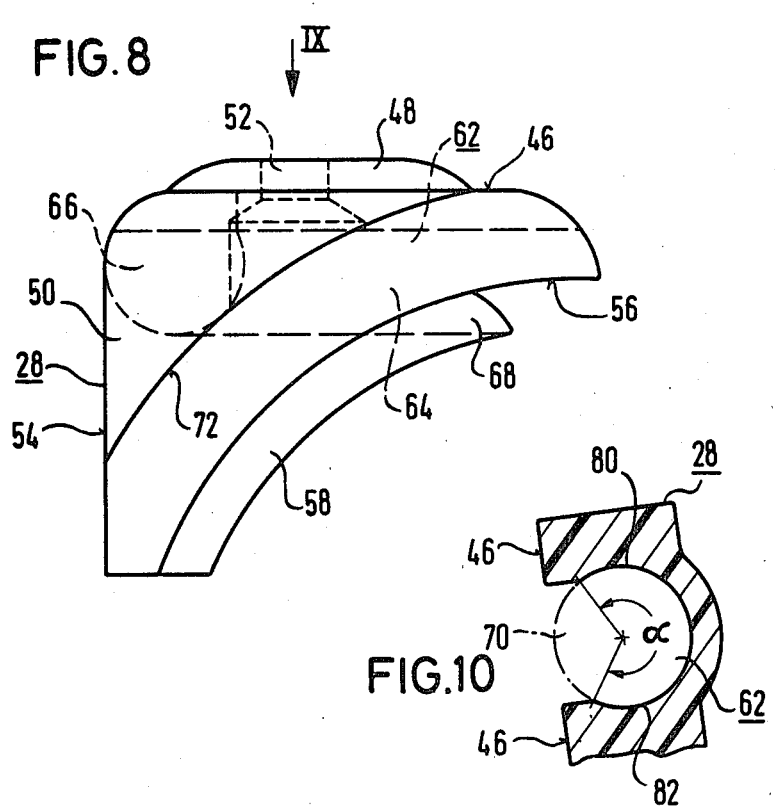
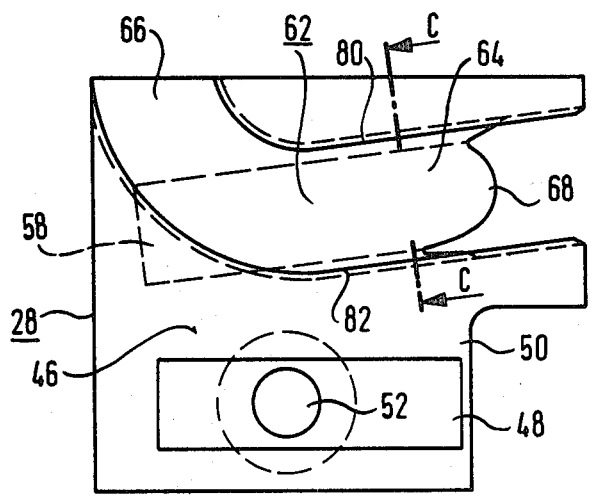

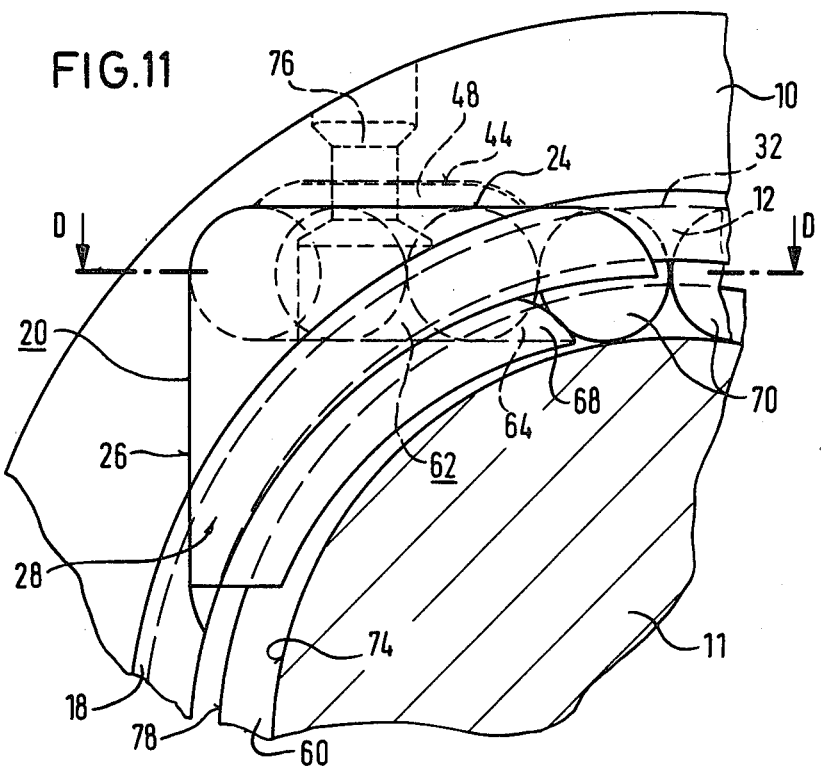
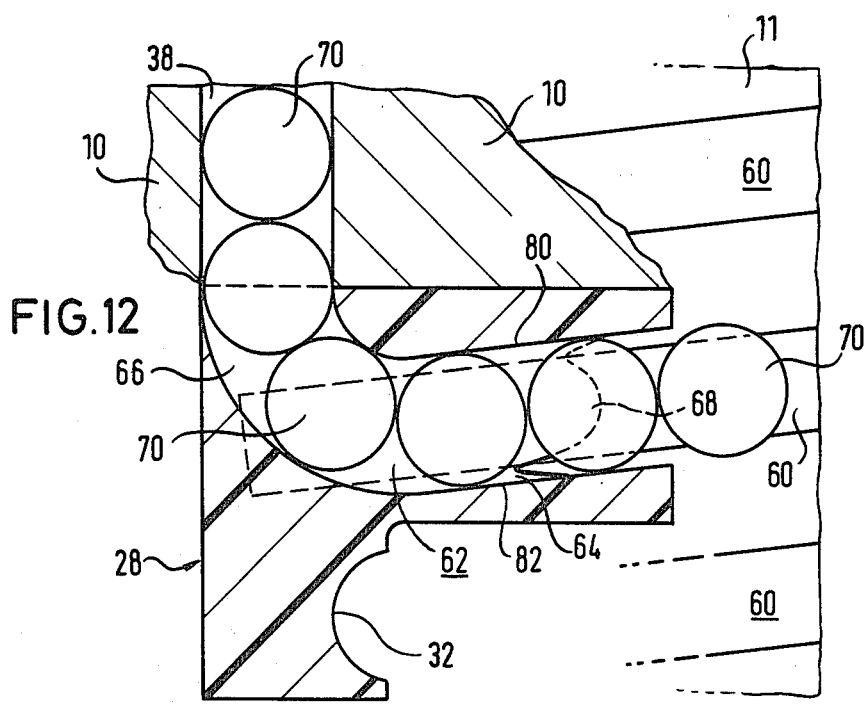

BALL SCREW AND NUT DRIVE DEVICE

SUMMARY OF THE INVENTION

The present invention is directed to a ball spindle or screw and nut drive device including a spindle or screw and a nut body. The nut body has an inner helical groove which in combination with the outer surface of the screw or spindle forms a helical ball channel through which a plurality of balls can be circulated in a continuous manner. Further, the nut body contains an axially extending ball return channel. A passageway between the helical ball channel and the ball return channel has two transition sections. These sections are formed by a deflecting member inserted into a recess formed in the inner surface of the nut body with the recess extending axially from one end face of the nut body. The recess is open through the inner surface of the nut body. The deflecting member has a deflecting projection extending tangentially into the helical ball channel for lifting the balls from the screw for passage into a deflecting channel within the member. From the helical ball channel, the deflecting channel consists of a tangential rectilinear or straight portion followed by a curved portion forming the transition section.

A ball screw and nut drive of this general type is disclosed in the West German Patentschrift No. 24 37 497. This known ball screw and nut drive has the following disadvantages.

The deflecting channel in the deflecting member has a closed circular cross section over its entire length. Accordingly, the deflecting member can be produced only by very specific methods, with one such method being casting which is used for economic reasons, note claim 3 of this West German patent publication. It has been found that the casting method is not very suitable because of its high production costs and because of the significant finishing tolerances involved.

The transition from the helical ball channel to the deflecting channel has been found in practice not to be completely jolt-free. Such jolting action occurs because the balls in the circumferential region of the deflecting channel on the side of the projection must pass not only through a transition from the helical ball groove bottom of the screw into the deflecting member but also through another transition at the opposite end of the deflecting channel between the deflecting member and the nut body. These transitions cause problems because of the relatively great finishing tolerances of the casting method used in their production. It has been found that the balls jolt at these transitions.

Moreover, the deflecting members produced by the casting method are relatively brittle and there is a danger that they may break, particularly in the region of the deflecting projection.

Further, it has been found in the known embodiment that the radial dimension of the deflecting member is so great that, when it is desired to reduce the outside diameter of the nut body, the wall thickness of the nut body in the region of the deflecting member becomes so thin that there is a danger of fractures developing during hardening and also during operation when jolts occur.

Therefore, it is the primary object of the present invention to provide a ball spindle or screw and nut drive device of the above-mentioned type for avoiding the unsuitable casting method and for producing the deflecting member by methods which are less expensive and afford a more accurate shape of the member, particularly for producing the deflecting members by injection molding of plastics material. Further, the deflecting member is arranged to afford a quieter run of the balls at the transitions between the helical ball channel and the ball return channel.

In accordance with the present invention, to overcome the previously experienced problems, a circumferentially extending part of the deflecting channel is open along its length on the opposite side from the projection. In this open part the balls passing through the deflecting channel contact a surface of the recess in the nut body which extends tangentially from the base of the helical ball groove in the nut body.

In this embodiment according to the invention, the formation of the deflecting member by injection molding, particularly the injection molding of plastics material, is no longer difficult because the deflecting channel is open along its length. Injection molding of the deflecting member results in increased production accuracy which in itself facilitates the quieter running of the balls through the deflecting member. Since the deflecting channel is open in the circumferential region on the side opposite the deflecting projection, it is possible for the balls to contact the surface of the nut body without any interruption over their entire path. The surfaces contacted by the balls can be easily and exactly finished. There is no location along the path of the balls where a change in the surface affording ball guidance occurs which would extend over the entire cross section of the ball guiding surfaces.

Since the ball deflecting channels are left open along their length, the deflecting member has a smaller dimension in the radial direction relative to the axis of the nut body, accordingly, the remaining wall thickness of the nut body in the recess containing the deflecting member is not as thin as it is under a comparable arrangement disclosed in the West German Patentschrift No. 24 37 497.

In the arrangement disclosed in U.S. Pat. No. 2,166,106 the same disadvantages are present with respect to the production of the deflecting member and the deflection of behavior as in West German Pat. No. 24 37 497. Admittedly, in the arrangement in U.S. Pat. No. 2,166,106, the difficulty with regard to the reduction of the wall thickness of the nut body resulting from the recess for the deflecting member does not exist, however, this difficulty is avoided only because the closed circumferential surface of the nut body is not involved and the deflecting member is inserted through a recess in the nut body which is continuously open in the radial direction. Such a construction causes the additional problem of exactly fixing the deflecting member in the radial direction of the nut body.

In British Pat. No. 892,612, an embodiment is shown where the deflecting channel in the deflecting member is open over its entire length, with the result that no difficulties are presented in production. In this known embodiment, however, the deflecting channel, viewed in the axial direction of the screw, has a sharp radially outwardly directed bend immediately following the ball channel, see FIG. 2 of the British patent, so that quiet running of the balls is not ensured, rather the running is rough and slow.

The problem of exactly positioning the deflecting member is difficult to solve. A seamless or smooth transition between the ball channel and the deflecting channel, as in the present invention, has not been provided in the past. It is particularly important to take into consideration that, at the transition from the ball channel to the deflecting channel at their radially outer surface regions relative to the screw axis, the balls are not guided by a continuous contact with the surface of the nut body, however, such a contact is afforded in accordance with the present invention.

Another item of the prior art which should be considered is British Pat. No. 957,330, however, in this patent, the deflecting members are not arranged in the nut body, but in end disks screwed onto the nut body. The deflecting members are inserted into these end disks through recesses which extend radially outwardly. The exact design of the deflecting member is extremely poorly described and does not indicate a complete solution for the problem of a smooth, jolt-free ball guidance in the region of the deflection of the balls.

Another characteristic of the present invention is the exact positioning and mounting of the deflecting members in the nut body and, moreover, detailed measures are disclosed which serve for the simple production of the nut body, for the simple production of the deflecting member, for the simple mounting of the deflecting member in the nut body and for a quiet guidance of the balls in the region in which they are deflected from one channel to another.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 8 is a view of a deflecting member taken in the direction of the arrow II in FIG. 1;

FIG. 9 is a view of the deflecting member taken in the direction of the arrow IX in FIG. 8;

FIG. 10 is a sectional view taken along the line C—C in FIG. 9;

FIG. 11 is an enlarged detail view of the part of the nut body and screw shown in FIG. 2;

FIG. 12 is a sectional view taken along the line D—D in FIG. 11;

DETAIL DESCRIPTION OF THE INVENTION

Figure 1:
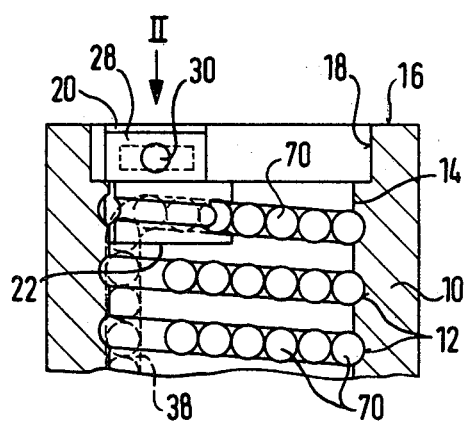
FIG. 1 is a partial longitudinal sectional view through the nut body of a ball screw and nut drive device embodying the present invention, however, without the screw but including the deflecting member and the balls spindle or, the view is taken in the direction of the arrow I in FIG. 2.
Figure 3:
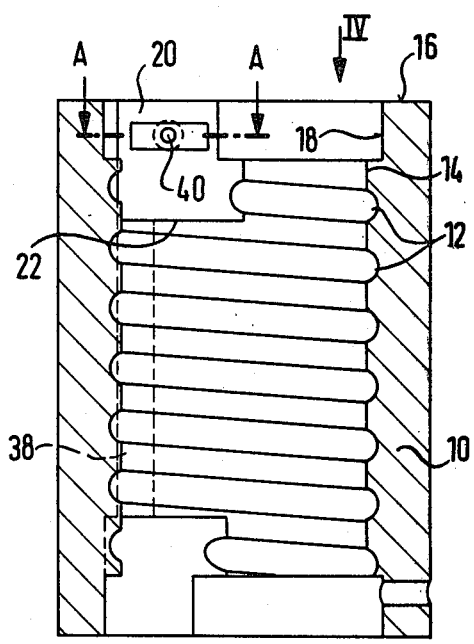
FIG. 3 is a full longitudinal sectional view of the nut body shown in FIG. 1, however, without the deflecting members and the balls.
Figure 2:
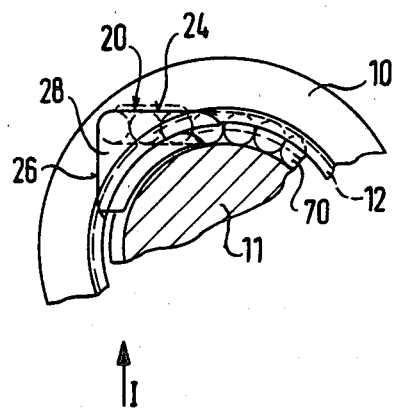
FIG. 2 is a partial end view of the ball screw and nut drive device shown in FIG. 1 taken in the direction of the arrow II in FIG. 1 with the screw, shown in section, inserted in the nut body.
Figure 4:
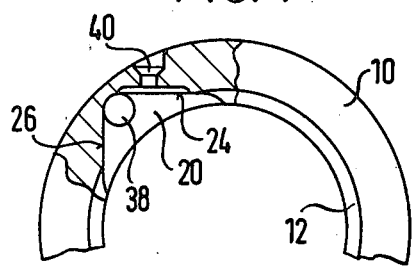
FIG. 4 is a partial end view of the nut body illustrated in FIG. 3 and taken in the direction of arrow IV in that figure, with a portion shown in section taken along the line A—A in FIG. 3.

In FIGS. 1 and 2 a spindle or screw and nut drive device is illustrated including a nut body 10 and a screw 11, the screw is not shown in FIG. 1. The nut body 10 laterally encircles the screw 11 and its circumferentially extending inner surface 14 has a helically extending nut groove 12 of semi-circular cross section, note FIG. 1. End face 16 extends transversely of the axial direction of the nut body and an annular recess 18 is formed in the inner surface 14 and extends axially inwardly from the end face. The manner of forming the recess 18 is optional. A prismatic recess 20 is formed into the inner surface 14 of the nut body and extends axially inwardly from the end face 16. As illustrated in FIG. 1, the recess has an end surface 22 spaced axially inwardly from the end face 16 and extending normally to the axis of the nut body 10. A first surface 24 and a second surface 26, as shown in FIG. 2, extend from the end surface 22 toward the end face 16. The first surface 24 and second surface 26 are located in planes extending parallel with the axis of the nut body. Inserted into the recess 20 is a deflecting member 28 which is fastened in place by a rivet 30. The details concerning the shape and fastening of the deflecting member 28 are shown in later figures.

Figure 6:
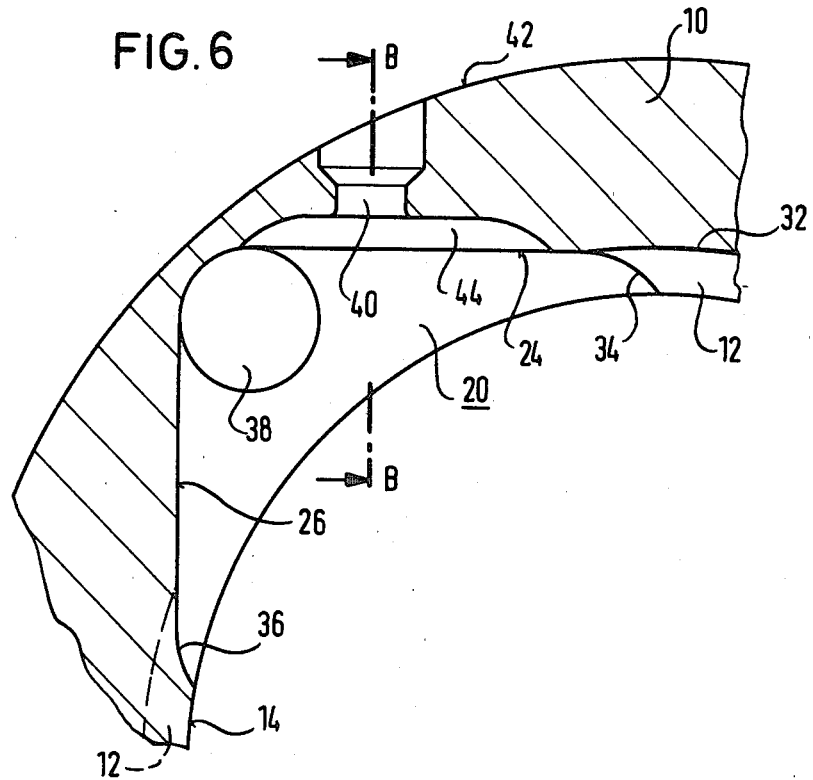
FIG. 6 is an enlarged detail view of a portion of the nut body illustrated in FIG. 4.

In FIG. 6, the exact configuration of the recess 20 is shown. In particular, it can be seen that the first surface 24 of the recess 20 extends continuously outward from and is tangential to the groove bottom 32 of the nut groove 12 in the inner surface 14 of the nut body. The end 34 of the first surface 24 at the nut groove 12 is rounded. The second surface 26 leads into the inner surface 14 of the nut body 10 via a rounded end 36. In FIG. 6 an axially extending ball return channel 38 is shown tangentially adjoining the opposite end of the rectilinear first surface 24 of the recess 20 from its rounded end 34.

Figure 7:
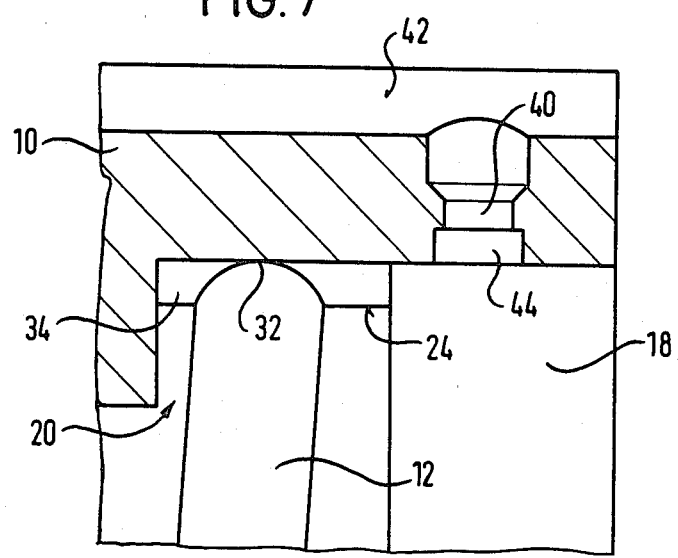
FIG. 7 is a sectional view taken along the line B—B in FIG. 6.

In FIGS. 6 and 7 a rivet hole 40 extends through the nut body from its circumferentially extending outer surface 42 into the recess 20. The rivet hole 40 is located in that part of the nut body in which the recess 18 is formed so that the recess 20 and 18 coincide in the axial direction of the nut body. As shown in FIGS. 6 and 7, the first surface 24 has an outwardly extending recess 44 which intersects the rivet hole 40.

Figure 5:
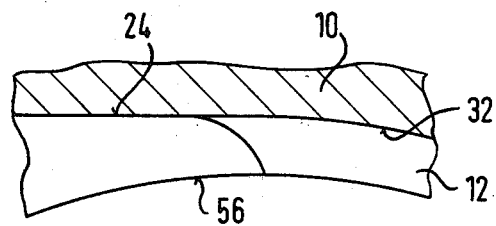
FIG. 5 is an enlarged detail view of the part of FIG. 4 corresponding to the section A—A shown in FIG. 4.

In FIG. 5, in an enlarged representation, the continuous tangential transition is shown from the first surface 24 in the recess 20 into the bottom 32 of the nut groove 12.

The deflecting member 28 is illustrated in detail in FIGS. 8 through 12. Deflecting member 28 has a first contact surface 46 which contacts the first surface 24 in the recess 20. A projection 48 is located above the first contact surface 46 and is arranged to engage in the recess 44 of the first surface 24. By means of the recess 44 and the projection 48 the deflecting member is fixed in the axial direction of the nut body within the recess 20. As shown in FIG. 9, the projection 48 is formed on an extension 50 of the deflecting member 28 which, in the assembled state, is located in the region of the recess 18. As viewed in FIG. 9, because of the direction in which the view is taken in FIG. 8, the top of the deflecting member 28 is shown at the lower end as is the extension 50. In the region of the projection 48, a rivet hole 52 extends through the projection in alignment with the rivet hole 40 in the nut body so that a fastening rivet can be positioned through the two rivet holes. A second contact surface 54 of the deflecting member 28 is arranged to contact the second surface 26 in the recess 20. The deflecting member 28 has an inner circumferential surface 56 when mounted within the nut body which inner surface is in alignment with the circumferentially extending inner surface 14 of the nut body. Projecting inwardly from the inner circumferential surface 56 of the deflecting member is a helical rib 58 which engages the last portion of the screw groove 60, note FIG. 11, from which the balls are deflected for passage through a deflecting channel 62 into the return channel 38.

The deflecting channel 62 in the deflecting member 28 extends along the first contact surface 46 and is made up of a rectilinear portion 64 extending tangentially of the bottom 32 of the groove 12 of the nut body and a curved portion, note FIG. 9, at the opposite end of the rectilinear portion from the inner surface of the nut body. As can be seen in FIG. 9, the rectilinear portion 64 extends above the helical rib 58 and, in combination with the rib forms a deflecting projection 68 extending into the path of the balls moving through the ball channel formed by the groove 12 in the nut body and the groove 60 in the screw. As shown in FIG. 10, the circumferential surface of the deflecting channel 62 in the deflecting member 28 is open through the first contact surface 46 so that the balls 70 passing through this channel contact the first surface 24 in the recess 20 in the nut body. As shown in FIG. 10, the deflecting channel 62 of the deflecting member 28 encloses the balls 70 along an arc α of more than 180°.

In FIG. 8, the circumferentially extending inner surface 72 of the extension 50 is shown flush with the circumferentially extending inner surface of the recess 18. Rivet hole 52 extending through the extension 50 intersects the inner surface 72 of the extension.

FIG. 11 shows the deflecting member 28 fitted into the recess 20 with its deflecting projection 68 extending inwardly into the groove 60 in the screw with the inner end of the projection being close to the bottom 74 of the groove 60 so that the balls 70 can be scooped up or lifted from the final thread of the screw groove 60 and introduced into the deflecting channel 62 initially entering the rectilinear portion 64 which extends tangentially of the groove 12. As the balls 70 pass from the helical ball channel formed by the nut body and screw into the deflecting channel 62, the balls remain in contact with the surface of the nut body running initially on the bottom or base 32 of the groove 12 in the nut body and then on the first surface 24 in the recess 20. The base 32 of the groove and the surface 24 form a continuous surface. FIG. 11 shows a rivet 76 securing the prismatic deflecting member 28 within the recess 20. The screw has a radially outer surface 78 into which the grooves 60 are formed.

FIG. 12 illustrates in a developed view the steady or continuous connection between the screw groove 60 and the tangentially extending rectilinear portion 64 of the deflecting channel 62 as well as the connection between the curvilinear portion 66 of the deflecting channel and the return channel 38 in the nut body.

In FIG. 12 it can be seen that the balls 70 are guided by the surfaces of the deflecting channel 62 in the deflecting member 28 at its two circumferentially extending portions 80 and 82 which are spaced apart in the axial direction of the nut body, note also FIGS. 9 and 10.

The deflecting member 28 is positioned in the recess 20 before the insertion of the screw 11 into the nut body 10 with the deflecting member being moved toward the first surface 24 in a direction perpendicularly of the first surface, so that the projection 48 can enter the recess 44 in the radial direction relative to the axis of the screw.

Figure 13:
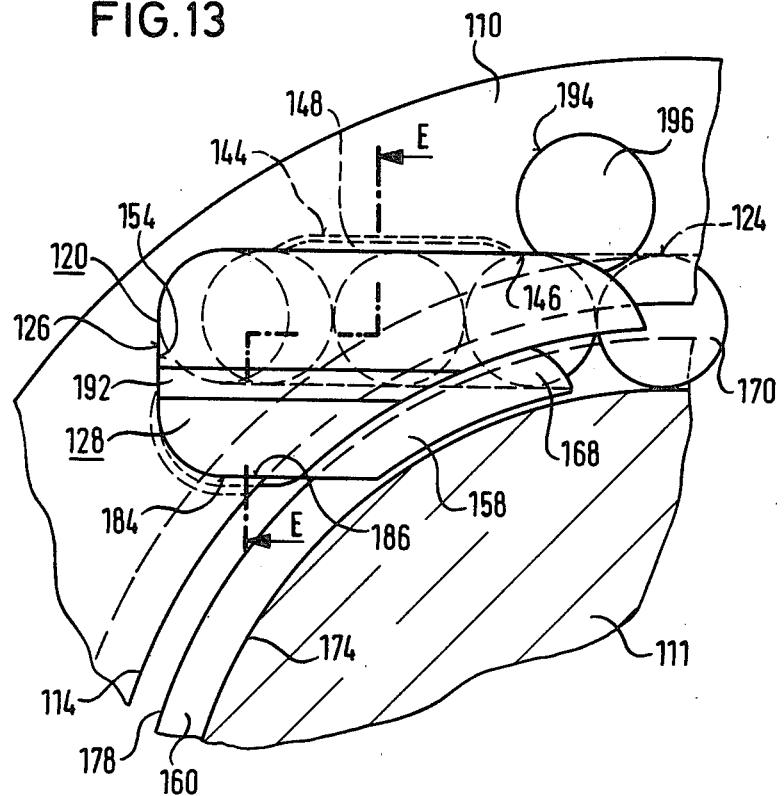
FIG. 13 is an enlarged view, similar to FIG. 11, displaying a modified embodiment of the present invention.
Figure 14:
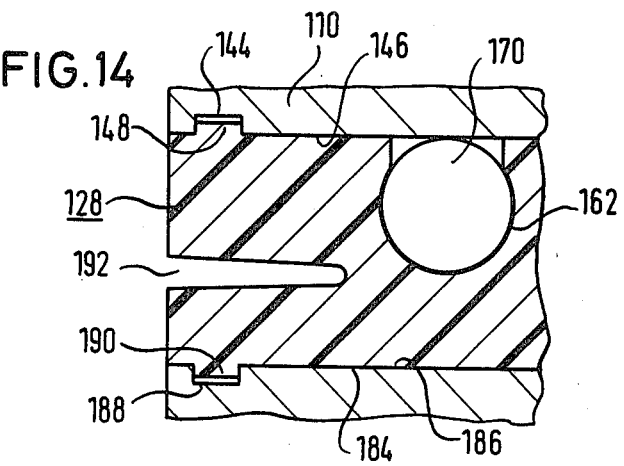
FIG. 14 is a sectional view taken along the line E—E in FIG. 13.

In the embodiment displayed in FIGS. 13 and 14, similar parts have the same reference numerals as in the embodiments shown in FIGS. 1 through 12, however, each reference numeral has been increased by the number 100.

In the embodiment illustrated in FIG. 13, the recess 120 has an additional, i.e., a third surface 184 against which a third contact surface 186 of the deflecting member 128 bears. In the third surface 184 another recess 188 is formed into which another projection 190 on the contact surface 186 fits. To enable the engagement of the projections 148 and 190 in the recesses 144 and 188, the deflecting member 128 is provided with a slot 192 so that its first and third contact surfaces move resiliently toward one another. In the first surface 124 in the recess 120 in the nut body 110, a support chamber 194 is provided into which a support projection 196 extends. The support projection is fastened to the first contact surface 146 of the deflecting member 128 and can be inserted into the support chamber 194 in the axial direction of the drive device.

Figure 15:
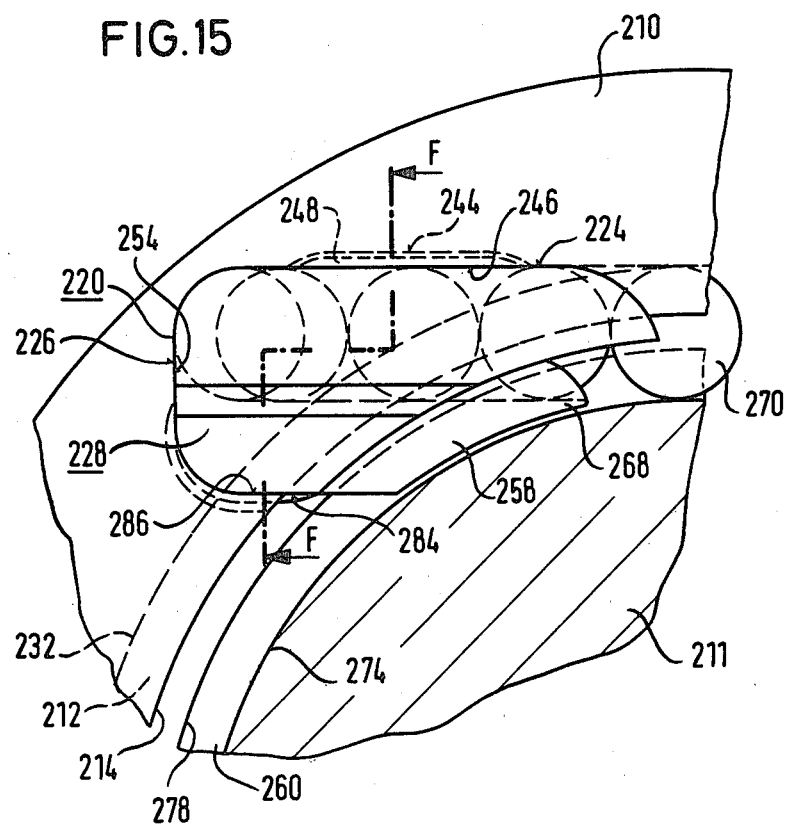
FIG. 15 is an enlarged section, similar to FIG. 11, of another modified embodiment of the present invention.
Figure 16:
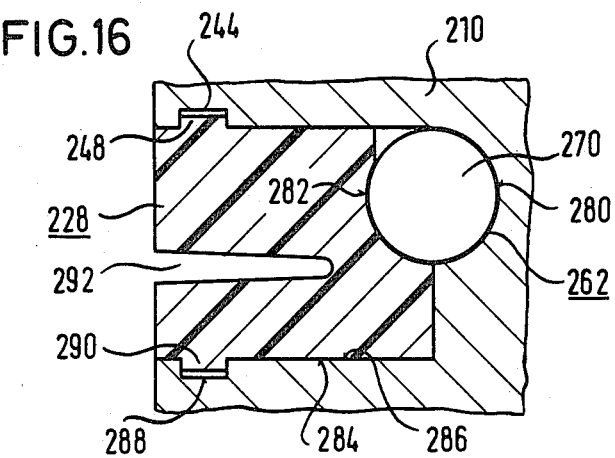
FIG. 16 is a section taken along the line F—F in FIG. 15.

In the embodiment exhibited in FIGS. 15 and 16, similar parts are provided with the same reference numerals as in FIGS. 13 and 14, however with an increase by the number 100.

In the embodiment shown in FIGS. 15 and 16 there is the difference over the embodiment in FIGS. 13 and 14 in that the support chamber 194 and the support projection 196 are omitted and, instead, the deflecting member 228 is glued into the recess 220. Furthermore, in the embodiment of FIGS. 15 and 16, the deflecting member 228 is shorter in the axial direction so that, contrary to the embodiments in FIGS. 9, 10 and 13, the deflecting channel is only unilaterally bounded by the deflecting member 228, that is, in the region 282 while the region 280 is provided by the nut body 210.

It is also possible that the balls are guided in a helical groove or channel in the nut body only and bear against a smooth spindle forming the screw, which spindle is under pretension. This embodiment of the ball screw and nut drive device is used in those instances in which no great forces can to be transmitted and no exact positioning is required. This system is inexpensive in its production and has the advantage that, in the case of overloading, the spindle can slip through and, thus, an overload protection is provided.

Figure 17:
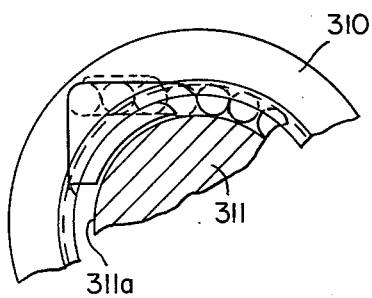
FIG. 17 is another embodiment of the present invention illustrating a partial end view of a ball spindle and nut drive device with the spindle, shown in section inserted in the nut body.

In FIG. 17 a spindle 311 with a smooth cylindrical surface 311 as is shown within a nut body 310.

Figure 18:
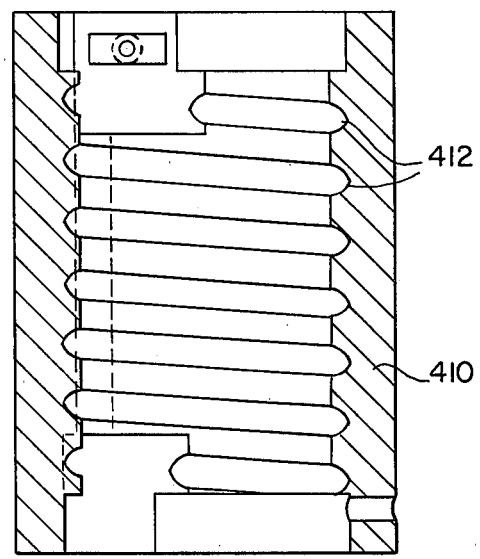
FIG. 18 is an axial section of still another embodiment showing another configuration of the helical grooves in the nut body.
Figure 19:
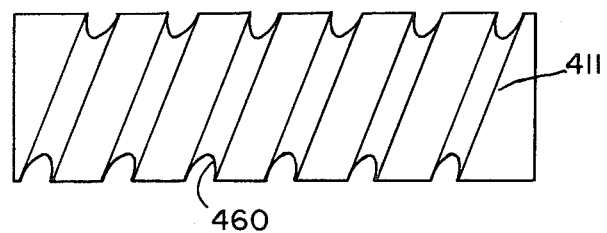
FIG. 19 is a side view of a spindle usable with the nut body illustrated in FIG. 18.

In FIGS. 18 and 19 a device is shown where the helical groove 412 of the nut body 410 and the complementary helical groove 460 of the spindle 411 each have a pointed arch profile with the radius of the arches being in the range of the radius of the balls and a radius of 10% greater than the radius of the balls.

Figure 20:
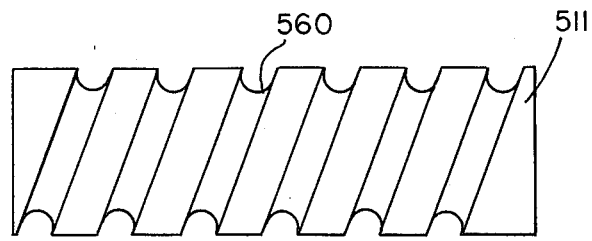
FIG. 20 is a side view of a spindle such as is usable with the nut body in FIG. 1 where the helical grooves are semicircular.

In FIG. 20 a spindle 511 is illustrated where the helical groove 560 as well as the cooperating helical groove in the nut body has an essentially semi-circular cross section with the helical ball channel formed by the grooves having a diameter in the range of the diameter of the balls to a diameter which is 10% greater than the ball diameter, preferably where the ball diameter is approximately 5% greater than the diameter of the balls.

While specific embodiments of the invention have been shown and described in detail to illustrate the application of the inventive principles, it will be understood that the invention may be embodied otherwise without departing from such principles.

What is claimed is:

1. Ball spindle and nut drive device comprising an axially extending spindle having a circumferentially extending outside surface, an axially extending nut body laterally enclosing at least a portion of the axially extending outside surface of said spindle, said nut body having an axially and circumferentially extending inside surface spaced outwardly from the outside surface of said spindle and an axially extending outside surface spaced outwardly from said inside surface, said nut body having an end face at each of the opposite ends thereof extending transversely of the axial direction of said nut body, the inside surface of said nut body having a helically extending groove therein, the outer surface of said spindle in combination with the helically extending groove in the inside surface of said nut body forming a helical ball channel, a plurality of balls for circulation through said helical ball channel, said nut body having an axially extending ball return channel speed outwardly from the inside surface of said nut body for passing said balls between the opposite ends of said helical ball channel, said nut body having a first recess extending axially from each of said end faces and formed in the inside surface of said nut body and each said first recess extending in the axial direction from said end face to at least the region of said helically extending groove with said first recess being open through said inside surface of said nut body, said first recess having a first surface, a deflecting member inserted into said first recess, said deflecting member having a deflecting channel therein and a deflecting projection extending from said deflecting channel tangentially into said helical ball channel for lifting said balls circulating through said ball channel into said deflecting channel, said deflecting channel having a rectilinear portion extending tangentially of said ball channel and a curvilinear portion at the end of said rectilinear portion spaced outwardly from said ball channel with said curvilinear portion extending into said ball return channel, wherein the improvement comprises that said deflecting channel being open for a portion of the circumferential surface along the length thereof on the side of said deflecting channel opposite said projection, and in the open portion of said deflecting channel said balls moving therethrough contact the first surface of said first recess, the first surface of said first recess being located in a plane parallel with the axis of said nut body and the first surface extending tangentially of and outwardly from the base of said helically extending groove in said nut body.

2. Ball spindle and nut drive device, as set forth in claim 1, wherein said deflecting channel is bounded in the circumferential direction by said deflecting member on the side of said deflecting channel closer to the adjacent end face and on the side thereof more remote from said adjacent end face.

3. Ball spindle and nut drive device, as set forth in claim 1, wherein said deflecting chamber is bounded by said deflecting member in the circumferential direction thereof on the side of said deflecting channel closer to the adjoining said end face and being bounded by said nut body on the opposite side of said deflecting channel more remote from the adjoining said end face.

4. Ball spindle and nut drive device, as set forth in claim 1, wherein said first surface of said first recess is planar and extends tangentially of said ball return channel.

5. Ball spindle and nut drive device, as set forth in claim 1, wherein said recess is closed toward said outside surface of said nut body.

6. Ball spindle and nut drive device according to claim 1, wherein a second recess formed in the inside surface of said nut body and extending from said end face thereof toward and spaced from the adjacent end of said helical ball channel, said first recess intersecting said second recess, and said deflecting member having an end extension in the axially extending region of said second recess and said end extension being disposed in locking engagement with said nut body for fixing the position of said deflecting member in said first recess.

7. Ball spindle and nut drive device, as set forth in claim 6, wherein the radially inner surface of said extension on said deflecting member corresponds to the circumferentially extending surface of said second recess so that the radially inner surface forms a continuation of the inner surface of said second recess in the region of said deflecting member.

8. Ball spindle and nut drive device, as set forth in claim 1, wherein said first recess has a second surface extending transversely of said first surface and located in a plane extending parallel with the axis of said nut body, said deflecting member having a first contact surface and a second contact surface extending transversely of said first contact surface with said first contact surface disposed in surface contact with said first surface in said said first recess and said second contact surface being disposed in surface contact with said second surface in said first recess when said deflecting member is positioned within said recess for fixing said deflecting member in the radial and peripheral directions.

9. Ball spindle and nut drive device, as set forth in claim 8, wherein said second contact surface extends substantially perpendicularly of said first contact surface.

10. Ball spindle and nut drive device, as set forth in claim 8, including means on said deflecting member for form locking engagement in said first recess in said nut body.

11. Ball spindle and nut drive device, as set forth in claim 10, wherein said means comprises a third recess formed in one of said first and second surfaces therein and said deflecting member having a second projection thereon arranged to fit in form locking engagement with the third recess in said first recess.

12. Ball spindle and nut drive device, as set forth in claim 10, including second means securing said deflecting member to said nut body against radially inwardly directed movement for preventing inward movement of said deflecting member out of said first recess.

13. Ball spindle and nut drive device, as set forth in claim 12, wherein said second means comprises a fastening member extending inwardly through said nut body and through said deflecting member for securing said deflecting member on said nut body.

14. Ball spindle and nut drive device, as set forth in claim 13, wherein said fastening element comprises a rivet-like member.

15. Ball spindle and nut drive device, as set forth in claim 12, including third means for securing said deflecting member within said first recess by a resilient locking action.

16. Ball spindle and nut drive device, as set forth in claim 15, wherein said third means comprises a support chamber formed in said nut body adjacent said first surface of said first recess close to the end of said first surface at the end of said helically extending groove and said nut body, said support chamber being offset from said rectilinear portion of said deflecting channel, and a support projection formed on and extending outwardly from said deflecting member and arranged to lockingly engage in said support chamber.

17. Ball spindle and nut drive device, as set forth in claim 16, wherein said support chamber and said support projection having complementary tapering portions for providing sliding interengagement between said support member and said support projection.

18. Ball spindle and nut drive device, as set forth in claim 15, wherein said first recess has a third surface extending from said second surface at a position spaced from said first surface with said third surface extending angularly relative to said second surface inwardly toward the inside surface of said nut body, said deflecting member having a third contact surface extending angularly from said second contact surface in spaced relation with said first contact surface so that said third contact surface is in surface contact with said third surface when said deflecting member is inserted into said first recess and said deflecting member being formed so that said first contact surface and said third contact surface can be moved toward one another against an elastic resistance.

19. Ball spindle and nut drive device, as set forth in claim 17, wherein said first contact surface and said third contact surface each have a fourth projection extending outwardly therefrom, each of said first and third surfaces of said first recess having a fourth recess therein for receiving said fourth projections on said deflecting member.

20. Ball spindle and nut drive device, as set forth in claim 18, wherein said deflecting member has a slot formed therein spaced between and in generally parallel relation with said first contact surface and said third contact surface for affording the elastic resistance when said first and third contact surfaces are moved toward one another.

21. Ball spindle and nut drive device, as set forth in claim 12, wherein an adhesive material secures said deflecting member within said first recess.

22. Ball spindle and nut drive device, as set forth in claim 1, wherein said deflecting channel in said deflecting member encloses said balls in the circumferential direction over an angular extent of at least 180°.

23. Ball spindle and nut drive device, as set forth in claim 1, wherein said outside surface of said spindle is a smooth cylindrical surface.

24. Ball spindle and nut drive device, as set forth in claim 1, wherein said spindle having a helical groove formed in the outside surface thereof and said helical groove in said spindle in combination with said helical groove in said nut body defining said helical ball channel.

25. Ball spindle and nut drive device, as set forth in claim 24, wherein said helical grooves in said nut body and said spindle have an essentially semi-circular cross section with a diameter corresponding to the diameter of said balls.

26. Ball spindle and nut drive device, as set forth in claim 24, wherein said helical grooves each have an essentially semi-circular cross section with the diameter of said helical ball channel formed thereby having a diameter in a range of the diameter of said balls to a diameter which is 10% greater than the ball diameter.

27. Ball spindle and nut drive device, as set forth in claim 26, wherein said helical ball channel has a diameter approximately 5% greater than the diameter of said balls.

28. Ball spindle and nut drive device, as set forth in claim 24, wherein said helical grooves in said nut body and said spindle have a pointed arch profile and the radius of said arches is in the range of the radius of said balls and a radius of 10% greater than the radius of said balls.

29. Ball spindle and nut drive device, as set forth in claim 28, wherein the radius of the pointed arch profile of said helical grooves is approximately 5% greater than the radius of said balls.

* * * * *